(12) United States Patent
Fackrell et al.

(10) Patent No.: US 7,336,159 B2
(45) Date of Patent: Feb. 26, 2008

(54) SYSTEM, METHOD AND DEVICE FOR RETROFITTING TRACTOR-TRAILER COMMUNICATIONS SYSTEMS

(75) Inventors: Elden Wade Fackrell, Surprise, AZ (US); Hector E. Flores, Goodyear, AZ (US)

(73) Assignee: Swift Transportation Co., Inc., Phoenix, AZ (US)

( * ) Notice: Subject to any disclaimer, the term of this patent is extended or adjusted under 35 U.S.C. 154(b) by 184 days.

(21) Appl. No.: 11/279,441

(22) Filed: Apr. 12, 2006

(65) Prior Publication Data

US 2007/0241868 A1    Oct. 18, 2007

(51) Int. Cl.
*G05B 11/01* (2006.01)
*B60T 7/20* (2006.01)

(52) U.S. Cl. ............... 340/431; 340/310.11; 303/123; 307/10.1

(58) Field of Classification Search ............... 340/431, 340/310.11; 307/9.1, 10.1; 303/123–124
See application file for complete search history.

(56) References Cited

U.S. PATENT DOCUMENTS

| | | | |
|---|---|---|---|
| 5,142,278 A * | 8/1992 | Moallemi et al. ........... 340/436 |
| 5,442,810 A * | 8/1995 | Jenquin ..................... 455/66.1 |
| 5,488,352 A | 1/1996 | Jasper |
| 5,501,605 A | 3/1996 | Ozaki et al. |
| 5,739,592 A | 4/1998 | Rigsby et al. |
| 5,920,128 A | 7/1999 | Hines |
| 6,127,939 A | 10/2000 | Lesesky et al. |
| 6,250,706 B1 | 6/2001 | Davis, Jr. et al. |
| 6,291,770 B1 | 9/2001 | Casperson |
| 6,437,702 B1 | 8/2002 | Ragland et al. |
| 6,483,200 B1 | 11/2002 | Jacobs |
| 6,501,376 B2 * | 12/2002 | Dieckmann et al. ........ 340/479 |
| 6,545,593 B2 | 4/2003 | DeWilde |
| 6,600,666 B2 | 7/2003 | Lott et al. |
| 6,608,554 B2 | 8/2003 | Lesesky et al. |
| 6,687,609 B2 | 2/2004 | Hsiao et al. |
| 6,901,657 B2 | 6/2005 | Takada |
| 6,909,956 B2 | 6/2005 | Weed et al. |
| 6,967,414 B1 * | 11/2005 | Wedding et al. ............. 307/9.1 |
| 2001/0038239 A1 | 11/2001 | Ehrlich et al. |
| 2003/0100305 A1 | 5/2003 | Parisi |
| 2004/0111207 A1 | 6/2004 | Weed et al. |
| 2004/0207514 A1 | 10/2004 | Lesesky et al. |
| 2005/0190045 A1 | 9/2005 | Lesesky et al. |
| 2006/0244309 A1 * | 11/2006 | Claussen et al. ............ 303/123 |

* cited by examiner

*Primary Examiner*—Jeffery Hofsass
*Assistant Examiner*—Anne V Lai
(74) *Attorney, Agent, or Firm*—Snell & Wilmer L.L.P.

(57) ABSTRACT

An improved tractor-trailer communications and tracking system retrofitting assembly, comprising an insulated wire, a flexible wire sleeve, a sealed fuse box, a male connector and a female connector is disclosed. The insulated wire has a length sufficient to at least span the distance between the rear portion of a tractor cab or sleeper box and the power line carrier filter. A first end of the insulated wire terminates in first and second wire segments of roughly equal length. The end portion of the first wire segment has a two-way female connector electrically attached thereto and the second wire segment has a two-way male connector electrically attached thereto. A third wire segment is electrically attached to the female two-way connector at a first end and to the male two-way connector at a second end.

23 Claims, 4 Drawing Sheets

SYSTEM, METHOD AND DEVICE FOR RETROFITTING TRACTOR-TRAILER COMMUNICATIONS SYSTEMS

FIELD OF THE INVENTION

The present invention relates generally to a tractor-trailer communications system, and more particularly, to a wiring assembly for retrofitting tractor-trailer combinations for wireless communications devices.

BACKGROUND OF THE INVENTION

The transport industry has benefited from various technologies that were either developed in response to unique problems or adapted from other industry applications to suit the specific needs of the transport industry. Managing large fleets of transport vehicles and their cargo has been an ongoing challenge. Scheduling pick-ups and deliveries of cargo involved imprecise tasks of mapping routes, along with calculating miles and driving time. Early on, the only practical means for monitoring a driver's progress and ensuring adherence to a schedule included the use of driver logs and sporadic telephone contact between a scheduler and a driver.

Compounding the problem is that a single tractor may haul any number of trailers over a wide geographical area. For example, a driver may attach a trailer loaded with fresh produce in Phoenix for delivery to Austin. In Austin, the same driver may disconnect from the trailer of fresh produce and drive across town to attach a trailer loaded with furniture which needs to be delivered to Denver. In Denver, the driver detaches the trailer loaded with furniture, and attaches a trailer loaded with canned goods which needs to be delivered to Albuquerque. As demonstrated by this example, good logistical planning is critical.

Cellular and satellite Global Positioning System (GPS) technologies have been adapted to the transport industry in response to logistical challenges such as those outlined above. Such systems enable remote tracking of both the tractor and trailer to provide real-time or near real-time information as to the position and identification of tractor and trailer units. One such system is the OmniTRACS® Mobile Communications Solution from Qualcomm® which provides wireless communication and satellite positioning through a two-way satellite wireless link. OmniTRACS comprises an integrated keyboard and display connected to a processing unit. While on the road, a driver can use the integrated keyboard and display to send and read messages which are sent and received via satellite.

Another system, also provided by Qualcomm, is TrailerTRACS®, which remotely provides trailer location and operational information including a unique trailer identifier. TrailerTRACS can provide trailer location information and an identifier of whether or not the trailer is tethered to a tractor. However, when used in conjunction with the OmniTRACS system, the two systems can communicate with each other and remotely provide information and identifiers for both the tractor and the trailer. A base station, for example, would be able to determine which trailers are connected to which tractors.

While systems such as those provided by Qualcomm provide viable solutions to the logistical problems associated with the transport industry, installation of the systems within large fleets of tractors and trailers can be a daunting task. Because tracking and communications systems are typically integrated within the existing electrical system of a tractor and trailer, installation most often requires a technician to cut into one or more electrical and/or data wires. If the tractor and/or trailer is under warranty, such retrofitting can void all or a portion of such warranty. Also, in creating a splice, it is necessary to cut into a wire which compromises the critical insulating properties of the wire. This can lead to environmental exposure and wire corrosion, thereby disrupting critical systems.

One way to avoid splicing into the existing electrical system of the tractor, is to add an additional umbilical solely dedicated for the transfer of electric power and data between the tractor and trailer, or to reconfigure the existing umbilical and connectors. However, these solutions would not only be labor intensive, but would not be practical in that tractor and trailer interchangeability is critical. As such, industry standards have been defined to ensure that any tractor can safely and effectively haul any trailer.

The standards for power exchange between a tractor and trailer have remained constant for the past several decades. Power is generally exchanged between the two units through a seven wire cable commonly referred to as an umbilical. The umbilical provides electrical current to the trailer to power, for example, turn signals, tail lights, side marker lamps, brake lights, Automatic Braking System (ABS), and the like. In order to promote uniformity throughout the industry, the Society of Automotive Engineers (SAE) has adopted standards for both the seven wire cable (SAE J1067) and the associated seven pin connector (SAE J560).

For the reasons set forth above, there is a need for a retrofitting method and assembly whereby tracking and communications systems may be quickly and safely installed within fleets of tractors and trailers. Because data relating to the tracking and communications system is exchanged between a tractor and trailer over an existing power line, it is desirable to tie into the power line, where a data signal is at its strongest and most reliable level. Moreover, there is a need for a retrofitting method and assembly that enables a technician to quickly and reliably tie into the existing tractor electrical and data transfer infrastructure, with minimal or no cutting and splicing.

SUMMARY OF THE INVENTION

To overcome the limitations in the prior art described above, and to overcome other limitations that will become apparent upon reading and understanding the present specification, hereinafter referred to as a "retrofitting assembly", the present invention is an improved system, method, and device for conveniently retrofitting tractors and trailers with Remote Communications and Monitoring (RCM) systems. While the manner by which such a device may be configured and used to address the foregoing disadvantages will be described in greater detail herein, in general, the present invention facilitates fast and reliable installation of a communications link between a trailer RCM unit and a tractor RCM unit without cutting into an existing wire to create a splice.

In accordance with an exemplary embodiment of the present invention, a retrofitting assembly is provided whereby RCM systems residing respectively in a tractor and a trailer can be connected via a tractor power line. In one embodiment, the retrofitting assembly is interconnected with a dedicated ABS power and data line to provide optimal signal strength and reliable data communications.

The retrofitting assembly comprises, for example, an insulated primary wire, a flexible wire sleeve, a male connector and a female connector. The insulated primary wire has a length sufficient to at least span the distance between the rear portion of a tractor cab or sleeper box and the Power Line Carrier (PLC) filter. A first end of the primary wire is threaded through a small opening located near the bottom of a tractor cab, or sleeper box if so equipped. The first end is connected to a RCM processor located within the cab or sleeper box. Two short wire segments are spliced to a second end of the primary wire. The end of a first short wire segment is affixed to a first conductive prong of a male two-way connector and the end of a second short wire segment is affixed to a first conductive prong of a female two-way connector. A first end of a third short wire segment is affixed to a second conductive prong of the male two-way connector and a second end of the third short wire segment is affixed to a second conductive prong of the female two-way connector.

The male two-way connector is electrically attached to the dedicated Anti-lock Braking System (ABS) female two-way connector leading out of a tractor's PLC filter. The female two way connector is attached to a dedicated ABS Electronic Control Unit (ECU) power line leading to the tractor's ABS ECU. As such, the tractor RCM unit and trailer RCM unit can exchange data through an existing dedicated power line, eliminating or reducing the need to cut into a wire to create a splice.

More specifically, in another example, the system includes a tractor and trailer communications system configured to transmit and receive communications signals remotely. The system includes, for example, a trailer control unit suitably positioned within a trailer, wherein the trailer control unit is configured to provide a trailer identifier and send data to a remote location; a processing unit suitably positioned within a tractor, wherein the processing unit is configured to provide a tractor identifier, send data to a remote location, and receive data from a remote location; and, a retrofitting assembly configured to facilitate data exchange between the processing unit and the trailer control unit, wherein the data exchange occurs over an existing power line linking the tractor and the trailer.

The features and advantages of the present invention will be apparent to those of ordinary skill in the art in view of the detailed description of the exemplary embodiments, which are made with reference to the drawings, a brief description of which is provided below.

BRIEF DESCRIPTION OF THE DRAWINGS

The above objects and advantages of the present invention will become more apparent by describing in detail exemplary embodiments thereof with reference to the attached drawings in which like reference numerals represent like parts.

DETAILED DESCRIPTION OF EXEMPLARY EMBODIMENTS

In the following description of exemplary embodiments, reference is made to the accompanying drawings, which form a part hereof, and in which is shown by way of illustration specific embodiments in which the invention may be practiced. It is to be understood that other embodiments may be utilized as structural and/or design changes may be made without departing from the scope of the present invention.

Figure 1:
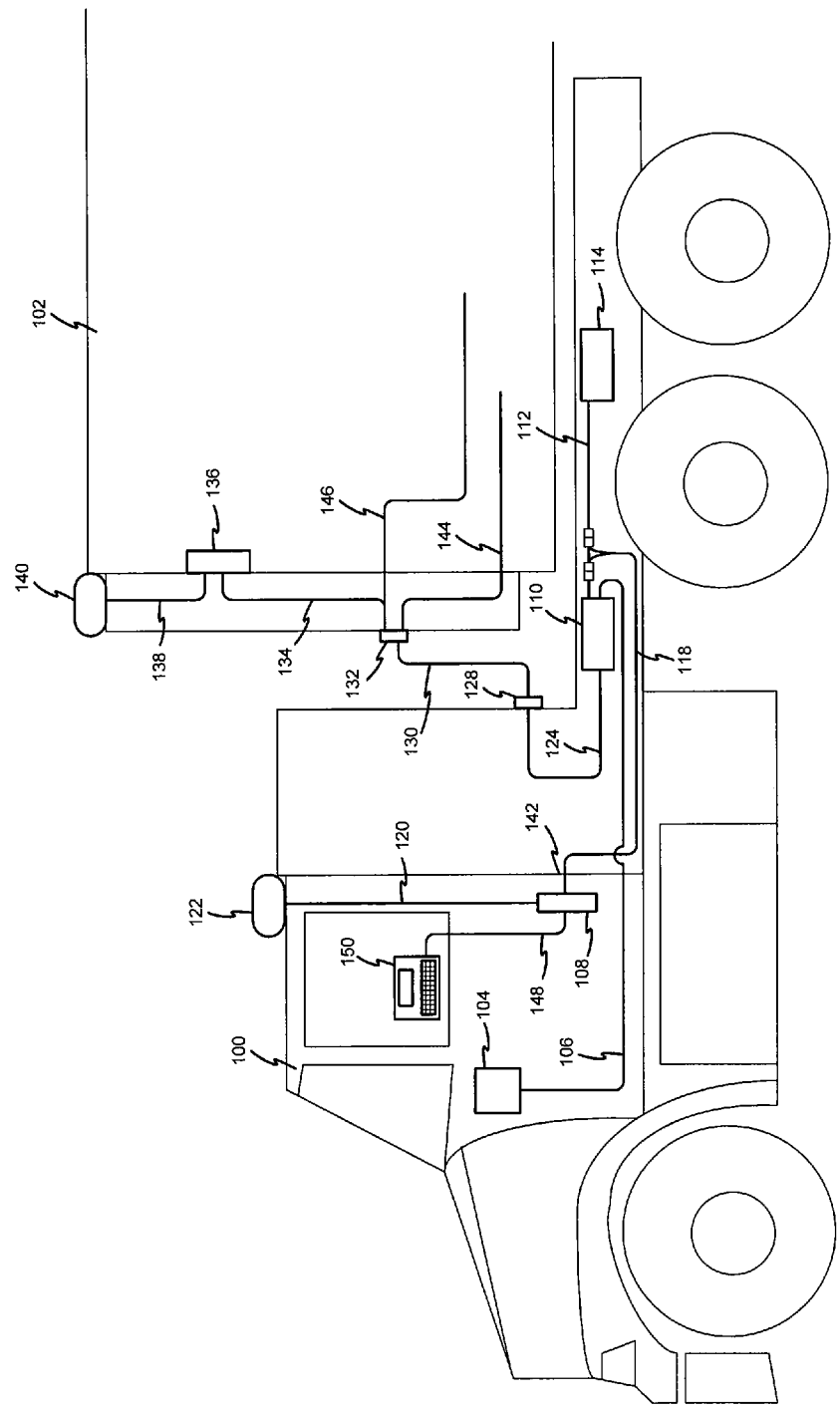
FIG. 1 is diagram showing major electrical components and wiring for PLC filter equipped tractor and a trailer with an exemplary retrofitting assembly engaged thereon according to an embodiment of the present invention.

Exemplary major electrical components and wiring for a Power Line Carrier (PLC) filter equipped tractor and a trailer, with an exemplary retrofitting assembly engaged thereon, is shown in FIG. 1 in accordance with an embodiment of the present invention. As used herein, the term "tractor" may refer to any vehicle having another vehicle in tow. Practitioners will appreciate that the electrical system configuration may vary among manufacturers and models of tractors and trailers. For example, some tractors are not equipped with a PLC filter 110. However, the retrofitting assembly of the present invention is equally applicable in such tractors as will be discussed in greater detail herein. Although described as a "retrofitting assembly", the invention also contemplates being incorporated in new systems, add-ons to system and/or stand alone systems.

DC power originating with a tractor ignition system is distributed to various components and subsystems of tractor 100 and trailer 102 through a Power Distribution Module (PDM) 104. As used herein, PDM 104 comprises any hardware and/or software suitably configured to facilitate the provisioning of electric power to any number of DC-powered components located on both the tractor and on the trailer. It will be appreciated that the positioning and configuration of PDM 104 may vary among makes and models of tractors and that some configurations may include more than one PDM 104.

If a tractor 100 is so equipped, power first passes through a PLC filter 110 by way of a PDM power line 106 before being distributed to other components and subsystems. As used herein, a PLC filter 110 comprises any hardware and/or software suitably configured to condition electronic signals by isolating varying signal frequencies and removing signal noise from data communications traveling over a power line.

To distribute power to various components and subsystems of trailer 102, DC power is routed from PLC filter 110 to a tractor power point 128 by way of an auxiliary power line 116. As used herein, tractor power point 128 and trailer power point 132 comprises any hardware suitably configured to receive an umbilical 130 connector. Trailer power point 128 may be of various configurations; however the present industry standard is a SAE J560 seven-way connector.

From tractor power point 128, auxiliary power and Anti-lock Braking System (ABS) data is passed to and from the trailer power point 132 by way of umbilical 130. As used herein, umbilical 130 comprises any hardware suitably configured to carry electric current and/or data between tractor power point 128 and a corresponding trailer power point 132. As is conventional in the art, and in one embodiment, an umbilical is a seven wire jacketed cable with a SAE J560 seven-way connector attached to each end.

Auxiliary power is dispersed to various trailer 102 components and subsystems through one or more trailer auxiliary power lines 144, while ABS power and data is dispersed to the trailer ABS through one or more dedicated trailer ABS power lines 146. Auxiliary powered components and subsystems may include, for example, turn signals, brake lamps, tail lamps, side marking lamps, and clearance lamps. Dedicated trailer ABS power line 146 may provide data exchange between the tractor 100 and trailer 102 for various trailer subsystems including, for example, ABS, suspension control, tire pressure sensors, RCM systems, and the like. Data originating from, or intended for, a trailer control unit 136 also utilizes dedicated trailer ABS power line 146 by way of a trailer control unit power and data line 134. In accordance with another embodiment, trailer auxiliary power line 144 and dedicated trailer ABS power line 146 may be one in the same.

As described above, various tractor and trailer subsystems not only consume power, but also produce and/or consume data. One such subsystem is the ABS. Most tractor-trailers on the road today are equipped with sophisticated braking systems that require serial data communications with an ABS ECU 114, which monitors and controls the trailer's ABS. Data is shared between the trailer's ABS system and ABS ECU 114 through umbilical 130, the tractor auxiliary power line 124, PLC filter 110, and ECU power/data line 112. The data passes through the PLC filter 110 to remove any electrical noise that may interfere with processing at the ABS ECU 114.

During braking, the wheel speed sensors on trailer 102 measure the rotational speed of the wheels and forward this information to ABS ECU 114. If ABS ECU 114 determines that one wheel is decelerating faster than another (indicating that the brake is about to lock), ABS ECU 114 directs solenoid valves to open, releasing hydraulic pressure to the brake until the rotational speed of the errant wheel matches the others. If ABS ECU 114 receives a signal indicating a problem within the trailer ABS, then it sends a signal to a trailer ABS indicator lamp, which is, in an exemplary embodiment, positioned within the operator's field of vision.

Other subsystems utilizing serial data communications between tractor 100 and trailer 102 are systems that provide RCM capabilities. Such systems are often standard equipment or upgrades on many late model tractors and trailers, however earlier models are routinely retrofitted with these systems. Such RCM systems include, for example, OmniTRACS and TrailerTRACS, both by Qualcomm. OmniTRACS provides wireless communications and satellite positioning capabilities through a two-way satellite wireless link. A tractor equipped with the OmniTRACS system can be tracked from a remote location and the driver can send and receive email communications with schedulers. TrailerTRACS is installed within a trailer and may be configured to provide position reports, including the identity of the trailer, when connected with OmniTRACS.

In accordance with an exemplary embodiment, the tractor installed RCM processor 108 is OmniTRACS and the trailer installed RCM control unit 136 is TrailerTRACS. However, it will be appreciated that the present invention may be equally applicable to other makes, models, and configurations of RCM systems. As such, the specific reference to the Qualcomm RCM products (OmniTRACS and TrailerTRACS) is for the purpose of explanation and does not serve to limit the scope of the invention.

TrailerTRACS can provide positioning reports, identification, and other information to a remote location whether or not the trailer 102 is attached to a tractor 100. A TrailerTRACS control unit 136, which is positioned either within the cargo area of a trailer 102 or within the trailer nosebox, sends and receives radio signals by way of a satellite antenna 140, which is connected with the TrailerTRACS control unit 136 via a trailer antenna line 138. However, in order for a remote station to have access to information pairing a tractor identifier with a trailer identifier, the TrailerTRACS control unit 136 should be in serial data communications with the OmniTRACS processing unit 108.

To optimize the strength and integrity of serial data communications between OmniTRACS processor 108 and TrailerTRACS control unit 136, retrofitting assembly 118 is optimally integrated within an existing dedicated line that is configured to transport data signals. The National Highway Transportation and Safety Administration (NHTSA) has mandated that all tractor and trailer units manufactured after 1998 must be ABS equipped and provide a dedicated power line and ground to an ABS ECU 114. Because a dedicated ECU power line 114 also transports data, it is well-suited to supply power and serial data communications to the OmniTRACS processor 108 and TrailerTRACS control unit 136. Moreover, the physical positioning of the retrofitting assembly 118 along the ECU data line 112 provides for optimal signal strength and reliability. The retrofitting assembly 118 completes a circuit between PLC filter 110 and ABS ECU 114 and communicates serial data signals to OmniTRACS processor 108. Retrofitting a tractor 100 and trailer 102 with the Qualcomm RCM in accordance with an exemplary embodiment of the present invention will be disclosed herein.

Figure 2:
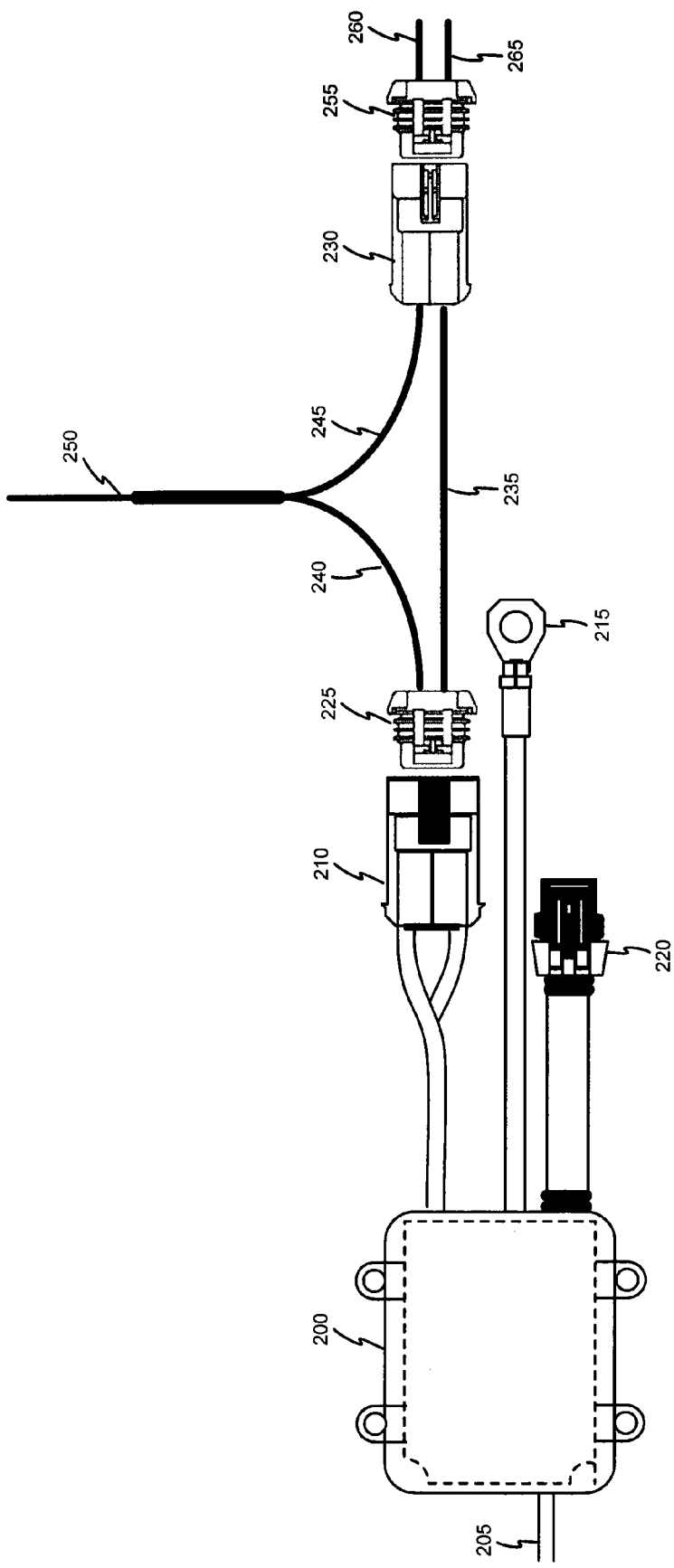
FIG. 2 is a diagram illustrating an exemplary positioning of the retrofitting assembly in respect to the PLC filter in accordance with an embodiment of the present invention.

With reference to FIG. 2, PLC filter 200 includes an auxiliary power connector 220 attached thereto to provide power to any number of trailer components and subsystems. A dedicated ABS ECU power connector 210 and dedicated ground 215 provide power and data communications to the ABS ECU 114. Auxiliary power connector 220 provides power to the tractor power point 128 via an auxiliary power line 124. Therefore, when umbilical 130 connecting the trailer 102 and tractor 100 is properly engaged, data signals originating from the TrailerTRACS control unit 136 are transported to the trailer's power point 132 by way of a dedicated data line 134 that merges with a trailer dedicated ABS power line 146. The data is transported across the umbilical 130, over auxiliary power line 124, through PLC filter 110 and over the retrofitting assembly 118 to be received by the OmniTRACS processing unit 108. The OmniTRACS processing unit 108 then routes a "trailer present" signal to the tractor's antenna 122 by way of an antenna line 120, wherein the signal is transmitted along with other identifying information to a remote monitoring location. A tractor operator may interact with OmniTRACS processing unit 108 to send and receive email through an integrated keyboard and display unit 150, which is suitably connected to OmniTRACS processing unit 108 by way of an interface data line 148.

With reference again to FIG. 2, a diagram is provided illustrating an exemplary positioning of the retrofitting assembly in respect to the PLC filter in accordance with an embodiment of the present invention. Reference will also be made to various components presented in FIG. 1 to demonstrate how the retrofitting assembly of the present invention is integrated within the electrical system of a tractor. DC power that is supplied by PDM 104 is received by an auxiliary connector 220 of PLC filter 200. Auxiliary connector 220 is electrically coupled to PDM power line 106. A typical PLC filter 200 configuration includes a power supply line 205, which is electrically coupled to auxiliary power line 124 to transport power to any number of trailer components and subsystems. ABS connector 210 facilitates the exchange of data signals between the trailer ABS and the tractor ABS ECU 114. An ABS ground 215 is also provided in accordance with some PLC filter 200 configurations. The ABS connector 210 is fitted with a male two-way connector 225 of retrofitting assembly and a female two-way connector 230 of retrofitting assembly is fitted with the ABS ECU power line connector 255. ABS ECU power line connector 255 has a first power line 260 electrically affixed thereto which originates at PDM 104, which provides ABS ECU 114 with dedicated power. A second power line 265 provides power and data exchange between ABS ECU 114 and the trailer ABS. Male two-way connector 225 and female two-way connector 230 of retrofitting assembly are interconnected by a ground wire segment 235 and a male connector signal carrying segment 240 and female connector signal carrying segment 245. The two signal carrying wire segments merge into a single signal carrying wire 250, which provides a data conduit to OmniTRACS processing unit 108.

Figure 3:
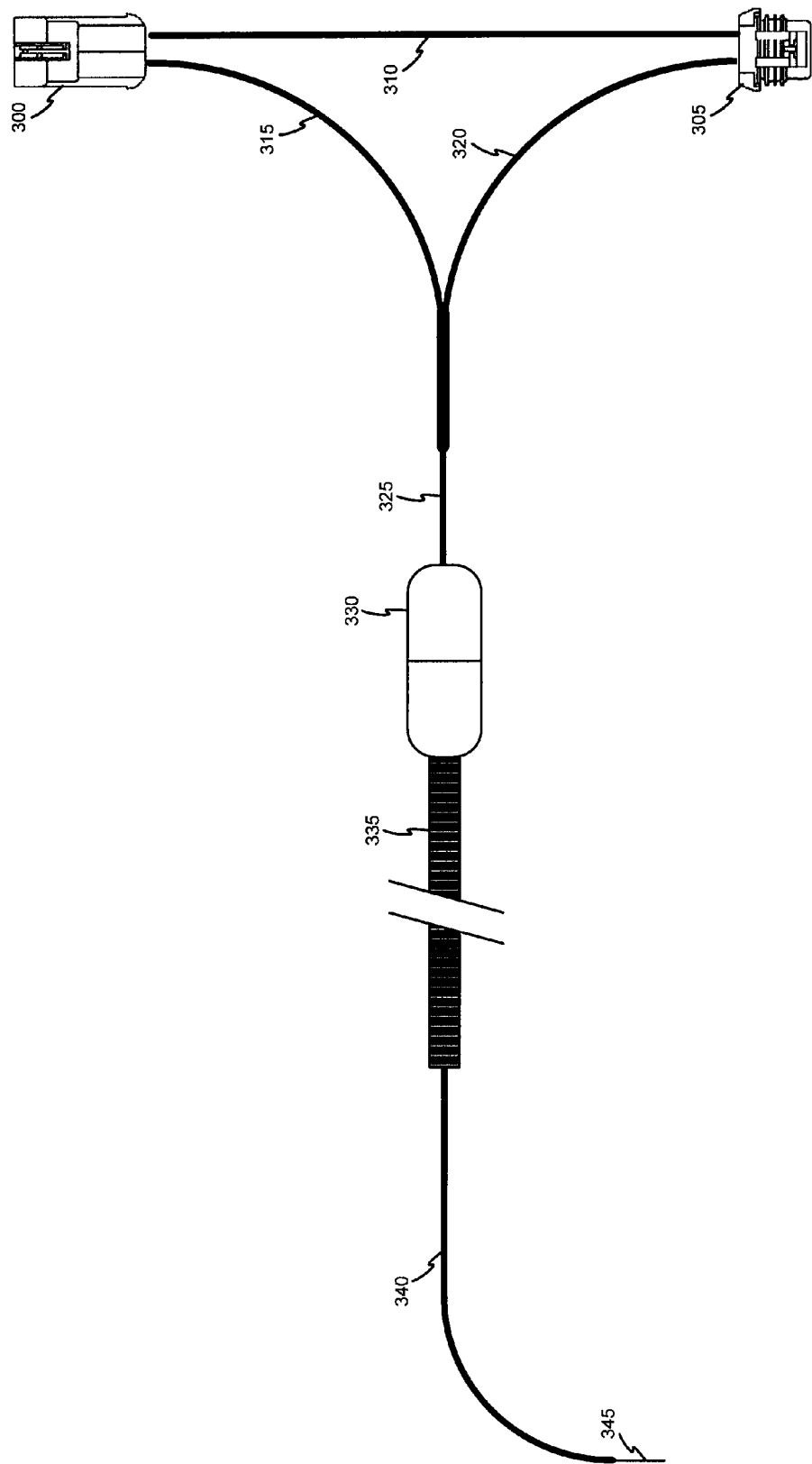
FIG. 3 is a drawing of an exemplary retrofitting assembly according to an embodiment of the present invention; and, FIG. 4 is a diagram showing major electrical components and wiring for a tractor not equipped with a PLC filter and a trailer with an exemplary retrofitting assembly engaged thereon according to an embodiment of the present invention.

FIG. 3 is a drawing of an exemplary retrofitting assembly in accordance with an exemplary embodiment of the present invention. While specific exemplary wire gages, insulating materials, connectors, and the like will be described herein, practitioners will appreciate that various other materials and configurations may be used in the manufacture of the retrofitting assembly without departing from the scope of the invention.

In an exemplary embodiment, female connector 300 and male connector 305 are Delphi® GT Series sealed connectors. Specifically, male connector 305 may be a GT Series male 2-way sealed connector, while female connector 300 may be a GT 150 female unshrouded sealed 2-way connector. However, regardless of configuration, the connectors are insulated and sealed in order to protect the terminals from environmental exposure.

Figure 4:
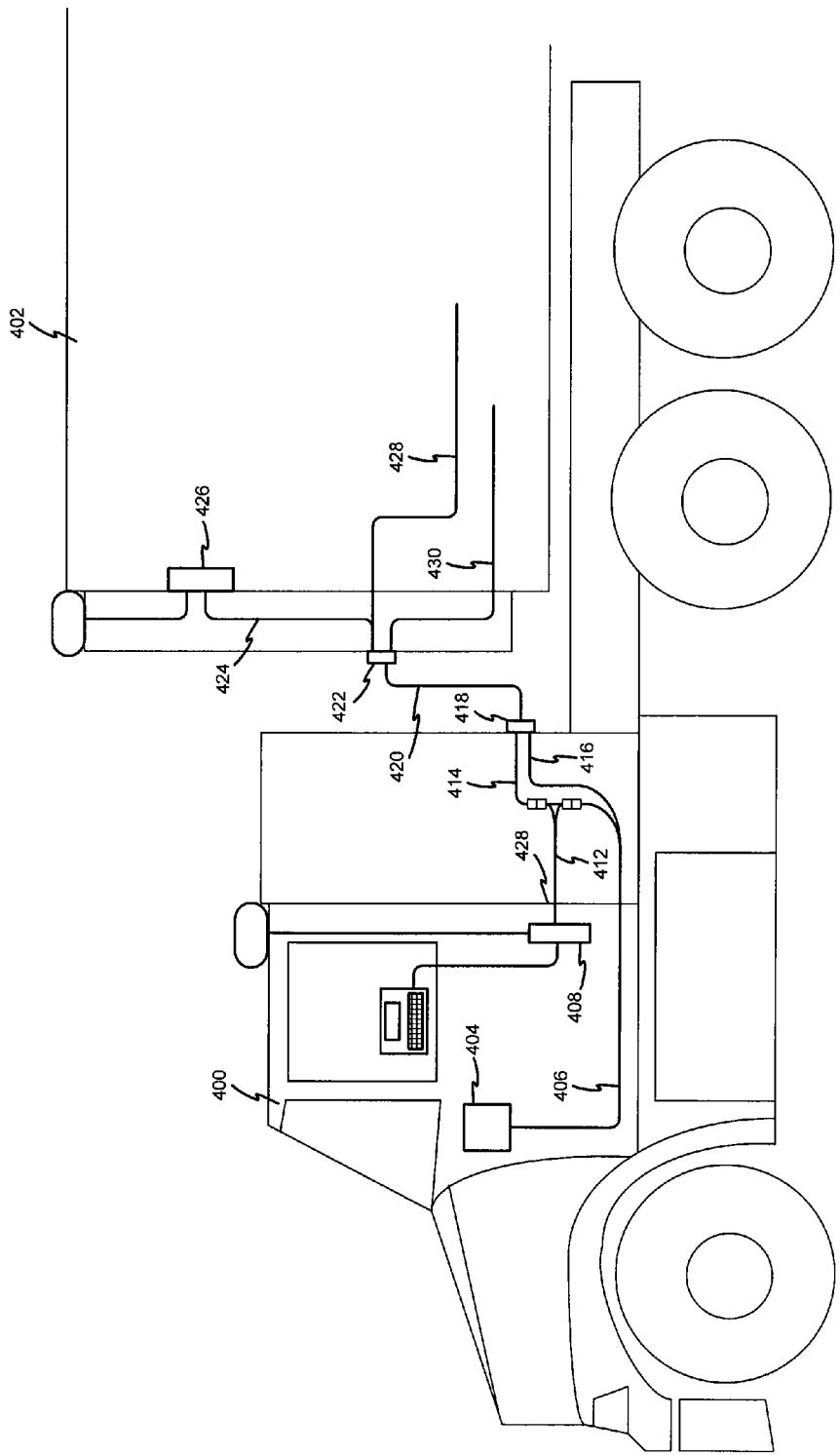

In another embodiment, and with reference to FIG. 4, the retrofitting assembly may be installed in a tractor that is not equipped with a PLC filter. In this embodiment, the power line connecting to male connector 305 may conduct greater amperage due to being in direct connection with PDM power line 406. PDM power line 406 typically conducts up to thirty amps, whereas current passing through a PLC filter is reduced to approximately 10 amps. As such, wire segments 310, 315, and 320 are, in an exemplary embodiment, a 10-gauge insulated copper wire. When the retrofitting assembly is configured for installation within a tractor equipped with a PLC filter, wire segments 310, 315, and 320 are 12-gauge insulated copper wire. Wire segment 325 is a 14-gauge insulated copper wire. However, practitioners will appreciate that the specific wire gages may vary according to specific amperage requirements.

Wire segment 315 and segment 320 are electrically connected to wire segment 325 where the connection is sealed and insulated, in an exemplary embodiment, with a heat shrinkable wraparound. A waterproof fuse holder 330, such as a Cooper Bussmann® BUSS-HFB is, in an exemplary embodiment, positioned along the length of wire segment 325. Waterproof fuse holder 330 houses a fuse to protect the circuitry of the OmniTRACS processing unit 108 from possible power surges.

A flexible wire sleeving 335 protects wire segment 325 when installed within a tractor. The retrofitting assembly may be secured to the tractor structure or existing wire bundles by way of straps or any other means known in the art. With frequent motion, an unprotected wire may be subject to chaffing of the wires' insulation. Over time, this could lead to exposure of the wire which may cause damage to the OmniTRACS processing unit or other electrical system components. Therefore, a durable and flexible wire sleeving helps to shield wire segment 325 from excess wear due to friction, debris, and environmental factors. Wire sleeving 335 covers the length of wire segment 325 from just below the waterproof fuse holder 430 to where wire segment 325 enters the cab or sleeper box of the tractor 142. A stripped end 345 of wire segment 340 is received by the OmniTRACS processing unit 108.

FIG. 4 is a diagram showing major electrical components and wiring for a tractor, not equipped with a PLC filter and a trailer with an exemplary retrofitting assembly engaged thereon, according to an embodiment of the present invention. As described above, the retrofitting assembly 412 of the present invention may also be incorporated within various other tractor electrical system configurations, including those that are not equipped with a PLC filter.

DC power originating from tractor PDM 404 is distributed to tractor power point 418 by way of PDM power line 406. Prior to reaching tractor power point 418, primary power line 406 splits to form an auxiliary power line 416 and a dedicated ABS power line 414. To distribute power to various components and subsystems of trailer 402, electric power is transported from PDM 404 to tractor power point 418 by way of auxiliary power line 416 and/or dedicated ABS power line 414.

From tractor power point 418, auxiliary power, ABS power, and ABS data is passed to and from a trailer power point 422 by way of umbilical 420. Auxiliary power is dispersed to various trailer 402 components and subsystems through one or more trailer auxiliary trailer power lines 428, while ABS power and data is distributed to the trailer ABS through one or more dedicated trailer ABS power lines 430. Dedicated trailer ABS power line 428 may provide data exchange between tractor 100 and trailer 102 for various trailer subsystems in addition to the trailer ABS. Data originating from, or intended for, TrailerTRACS control unit 426 also utilizes dedicated trailer ABS power line 428 by way of a TrailerTRACS control unit power and data line 424. According to another embodiment, auxiliary trailer power lines 428 and dedicated trailer ABS power line 428 may be one in the same.

The foregoing descriptions of the exemplary embodiments of the invention have been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

We claim:

1. A tractor and trailer communications system configured to transmit and receive communications signals remotely, said communications system comprising:
   a trailer control unit suitably positioned within a trailer, wherein said trailer control unit is configured to provide a trailer identifier and send data to a remote location;
   a processing unit suitably positioned within a tractor, wherein said processing unit is configured to provide a tractor identifier, send data to a remote location, and receive data from a remote location; and,
   a retrofitting assembly configured to facilitate data exchange between said processing unit and said trailer control unit wherein said data exchange occurs over an existing power line linking said tractor and said trailer.

2. The system of claim 1, wherein said trailer control unit is further configured to at least one of monitor environmental conditions, monitor motion, receive data from a remote location, send data to a processing unit, receive data from a processing unit and provide a location identifier.

3. The system of claim 1, wherein said processing unit is further configured to at least one of send data to said trailer control unit, receive data from said trailer control unit, monitor environmental conditions, monitor motion and provide a location identifier.

4. The system of claim 1, further comprising a tractor antenna configured to facilitate at least one of sending and receiving data to communicate with at least one of said remote location, said trailer control unit, and said processing unit.

5. The system of claim 1, further comprising a trailer antenna configured to facilitate at least one of sending and receiving data to communicate with at least one of said remote location, said trailer control unit, and said processing unit.

6. A retrofitting assembly configured to facilitate data exchange between a processing unit and a trailer control unit, said retrofitting assembly comprising:
   an insulated data wire having a first end and a second end;
   a first insulated wire having a first insulated wire first end electrically connected to said second end of said insulated data wire and a first insulated wire second end electrically connected to a first conductive prong of a male connector;
   a second insulated wire having a second insulated wire first end electrically connected to said second end of said insulated data wire and a second insulated wire second end electrically connected to a first conductive prong of a female connector; and,
   a third insulated wire having a third insulated wire first end electrically connected to a second conductive prong of said male connector and a third insulated wire second end electrically connected to a second conductive prong of said female connector.

7. The retrofitting assembly of claim 6, wherein said insulated data wire is wrapped in a flexible protective sleeve.

8. The retrofitting assembly of claim 6, wherein a fuse box is conductively positioned between a first segment of said insulated data wire and a second segment of said insulated data wire.

9. The retrofitting assembly of claim 6, wherein said first insulated wire, said second insulated wire, and said third insulated wire are each a ten-gauge copper wire and said insulated data wire is a fourteen-gauge copper wire.

10. The retrofitting assembly of claim 6, wherein said first insulated wire, said second insulated wire, and said third insulated wire are each a twelve-gauge copper wire.

11. The retrofitting assembly of claim 6, wherein said male connector is a sealed two-way connector and said female connector is a sealed two-way connector.

12. A method for retrofitting a tractor and trailer with a communications system configured to transmit and receive communications signals remotely, said method comprising the steps of:
   positioning a processing unit in at least one of a tractor cab and a tractor sleeper box, wherein said processing unit is electrically connected to a tractor power distribution module;
   positioning a trailer control unit in at least one of a trailer cargo bay and a trailer nose box, wherein said trailer control unit is electrically connected to a trailer power point;
   electrically connecting a first end of an insulated data line to said processing unit, wherein said insulated data line comprises:
      a first insulated wire having a first insulated wire first end electrically connected to a second end of said insulated data wire and a first insulated wire second end electrically connected to a first conductive prong of a male connector;
      a second insulated wire having a second insulated wire first end electrically connected to said second end of said insulated data wire and a second insulated wire second end electrically connected to a first conductive prong of a female connector; and,
      a third insulated wire having a third insulated wire first end electrically connected to a second conductive prong of said male connector and a third insulated wire second end electrically connected to a second conductive prong of said female connector;
   connecting said male connector to a dedicated power line female connector; and,
   connecting said female connector to a dedicated power line male connector, wherein said dedicated power line terminates at a tractor anti-lock braking system electronic control unit.

13. The method of claim 12, further comprising positioning an antenna device at said tractor, wherein said antenna device is electrically connected to said processing unit.

14. The method of claim 12, further comprising positioning an antenna device at said trailer, wherein said antenna device is electrically connected to said trailer control unit.

15. The method of claim 12, wherein said dedicated power source female connector is a dedicated anti-lock braking system power source connector.

16. The method of claim 12, wherein said insulated data wire is wrapped in a flexible protective sleeve.

17. The method of claim 12, wherein said insulated data wire includes a fuse box conductively positioned between a first segment of said insulated data wire and a second segment of said insulated data wire.

18. The method of claim 12, wherein said first insulated wire, said second insulated wire, and said third insulated wire are each a ten-gauge copper wire and said insulated data wire is a fourteen-gauge copper wire.

19. The method of claim 12, wherein said first insulated wire, said second insulated wire, and said third insulated wire are each a twelve-gauge copper wire.

20. The method of claim 12, wherein said male connector is a sealed two-way connector and said female connector is a sealed two-way connector.

21. The method of claim 12, wherein said trailer power point and said tractor power point is a SAE J560 seven-way connector.

22. The method of claim 12, wherein said processing unit is OmniTRACS® from Qualcomm®.

23. The method of claim 12, wherein said trailer control unit is TrailerTRACS® from Qualcomm®.

* * * * *